United States Patent [19]

Steen et al.

[11] 4,456,936
[45] Jun. 26, 1984

[54] CANTILEVERED TRANSDUCER CARRIAGE

[75] Inventors: Michael J. Steen, Longmont, Colo.; Michael N. Zell, Rochester, Minn.

[73] Assignee: International Business Machines Corporation, Armonk, N.Y.

[21] Appl. No.: 340,170

[22] Filed: Jan. 18, 1982

[51] Int. Cl.³ .......................... G11B 5/48; G11B 21/24
[52] U.S. Cl. .................................... 360/104; 360/109
[58] Field of Search ....................... 360/106, 104–105, 360/109

[56] References Cited

U.S. PATENT DOCUMENTS

| | | | |
|---|---|---|---|
| 3,943,568 | 3/1976 | Suzuki | 360/106 |
| 3,994,018 | 11/1976 | Kihara et al. | 360/105 |
| 4,188,645 | 2/1980 | Ragle et al. | 360/109 X |
| 4,374,402 | 2/1983 | Blessom et al. | 360/104 |

Primary Examiner—John H. Wolff
Attorney, Agent, or Firm—Robert W. Lahtinen

[57] ABSTRACT

A magnetic transducer support assembly includes parallel flexure spring supporting elements which are of sufficient length to approximate linear motion over the length of translational displacement used. The flexures are formed of a single continuous length of flat spring material, and built-up portions on the spring stretches between the base member and transducer carriage are provided to resist twisting and other unwanted motions induced by vibration and similar influences. Displacement is achieved by cam actuation driven by a stepper motor which may control multiple such transducer mountings on a single side of a disk or on opposite sides of a disk.

7 Claims, 3 Drawing Figures

CANTILEVERED TRANSDUCER CARRIAGE

BACKGROUND OF THE INVENTION

This invention relates to magnetic disk drive systems and more particularly to an actuator apparatus for supporting and positioning a magnetic head across the surface of a rotating magnetic disk.

Flexible magnetic disk drives are commonly used where random access memories are required or useful at very reasonable cost. Such applications are also often subject to less controlled environmental conditions than encountered by many other forms of data storage equipment that may even have prerequisite minimum standard conditions. In addition diskettes or flexible disk cartridges must be capable of interchange between drives to permit disks written on one drive to be read subsequently on another drive. Such drives should be of simple construction, not only to satisfy the economy requirement, but also to fulfill continuously more demanding requirements for more compact physical dimensions.

Existing drives found in the prior art commonly have complex mechanical assemblies for performing the track to track access of the head or transducer which include guiderods, pulleys, lead screws and mounting hardware.

SUMMARY OF THE INVENTION

The parallel flexure mounted transducer support assembly carries a read/write transducer which is positioned with respect to the data track portions of the magnetic recording media. The principal portions of the assembly are a U-shaped flat spring element with a support block at one end and a carriage which mounts the transducer at the other end. Intermediate the support block and carriage are built-up portions which surround the individual parallel spring elements. The built-up portions cause the pair of long flexure spring elements, which are required to perform the function, to act as two pairs of short springs and thereby resist undesirable motions such as twisting. This structure permits the transducer mounting assembly to be cam driven to enable the transducer positioning apparatus to be simple in structure, economical to produce and compact to reduce space requirements. The use of a single U-shaped spring element to form the parallel flexure mounting elements assures greater uniformity of the flexure elements since they are formed of continuous portions of a single length of flexure material.

The transducer support assembly may be economically fabricated by forming the base member, carriage and built-up portions in a single molding operation, wherein the U-shaped flexure spring is an insert in the mold cavity. A further extension of this concept would be to mold the assembly as an integral part of the disk drive base by incorporating the base member as an integral part of the device base molding or casting.

DETAILED DESCRIPTION

Figure 2:
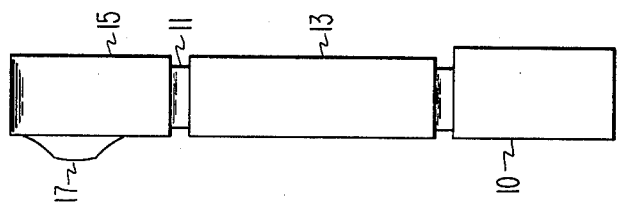
FIG. 2 is a side elevation of the transducer support assembly of FIG. 1.
Figure 1:
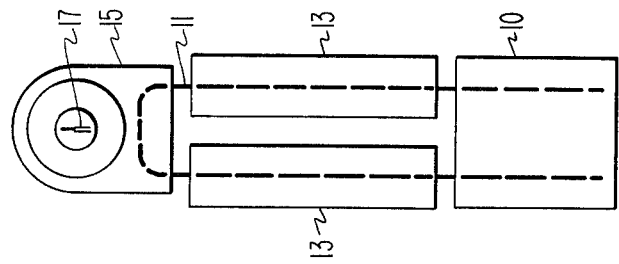
FIG. 1 is a bottom view of the cantilevered transducer support assembly with the U-shaped flexure spring element shown partially in phantom view.

The cantilevered head carriage of FIGS. 1 and 2 is a simplified structure which contains the read/write head and enables the positioning of the head with respect to the magnetic recording media. The assembly includes a base member 10 which is rigidly attached to the drive frame or casting (not shown), a flat spring 11 which functions as a flexure pivot, built-up sections 13 which reinforce the center portions of the flexure spring 11, and a carriage 15 which houses the transducer or read/write head 17.

The system takes advantage of the fact that when a force is applied to the carriage 15 perpendicular to the long axis of the cantilever springs 11, carriage 15 will deflect such that the read/write core elements of the head will maintain a constant orientation. For example, if carriage 15 is set in its initial undeflected state so that the centerline of the read/write gap of a head is coincident with a data representing a radial line of a diskette and perpendicular to the long axis of the cantilever springs 11, then as the force is applied (which is in a direction parallel to the datum), the centerline of the read/write gap of the head or transducer 17 in the deflected position will be parallel to its initial undeflected position and also to the datum. However, the carriage 15 will have undergone a displacement perpendicular to the dataum as a result of the cantilever springs being inextensible and rigidly attached to both base member 10 and carriage 15.

In order to use the motion characteristics of a flexure pivot as the basis for a head carriage, a long flat spring has been formed into a U-shape with the built-up sections 13 in the centers of the parallel legs of the U-shaped spring.

By forming a long, flat strip of spring steel into a U-shape and then molding the carriage 15 and base member 10 around the spring as shown in FIGS. 1 and 2, the best match in dimensions and mechanical properties of the flexure pivot is achieved, resulting in the most predictable, repeatable motion of the carriage. This is important for producing diskette drives which are required to read and write on interchangeable media that may be written by one device and read by another, such that a high degree of accuracy is required in locating the read/write head with respect to the media. The built-up sections 13 are provided to make the system as resistent as possible to all motions, rotations and vibrations in directions other than the track to track accessing direction. It is desirable that the design be sufficiently resistent to the undesired rotations and motions while still requiring minimum force to access the carriage through the range of travel from one extreme position to the other.

Figure 3:
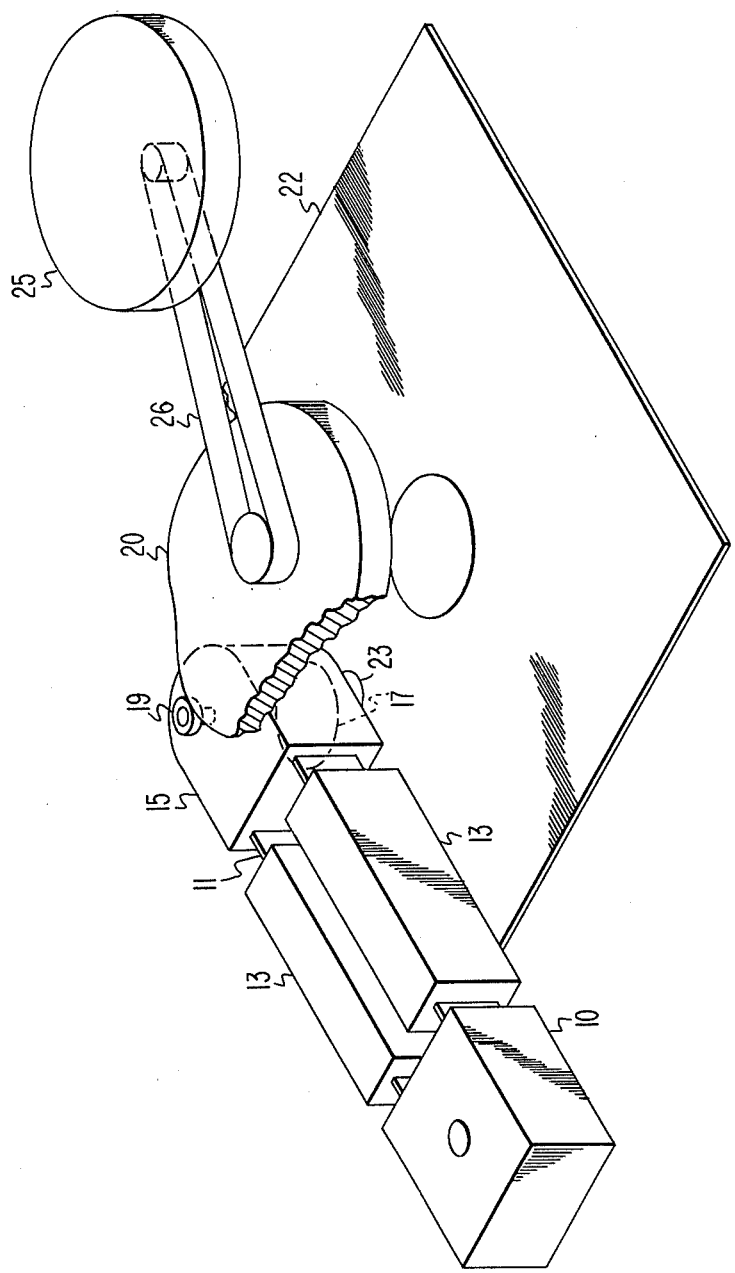
FIG. 3 is a showing of the cantilevered transducer support assembly with a cooperating diskette and stepper motor driven cam accessing drive mechanism.

As seen in FIG. 3, the cantilevered head carriage assembly may be incrementally driven from track to track by a cam. As shown, a roller-follower 19 attached to the head carriage 15 and a positioning cam 20 cooperate to position the head 17 with the diskette that is within the envelope 22 accessible through access opening 23. Stepper motor 25 is used with the timing belt 26 to drive the cam 20. Since an object of the design is to produce as compact a drive as possible, the size limits on the stepper motor which drives the cam actuator system restricts the amount of torque available; thus, there is a need for a low translational stiffness of the flexure pivots. In order to keep the head in contact with the media to allow the device to function satisfactorily, it must be well restrained and resistent to outside vibrations and other similar influences, thus the need for high tortional stiffness of the flexure pivots. The use of the described structure for a head accessing mechanism not only achieves a reduction in the number of required parts for the assembly, but added benefits exist in the much lower assembly time, tolerance reductions and the existence of few machining requiremets on the drive base molding or casting to mount components.

As a means of doubling the capacity of this system, two cantilevered head carriage assemblies could be mounted on a base casting, 180° diametrically opposed and operating over a different range of track radii, both driven by the same cam. Double-sided recording could be achieved by mounting one head on each side of the media, 180° diametrically opposed and with appropriate linkings still use the same actuator system. Each of these configurations strives to meet the same goal of a simple, low cost, compact drive.

While the invention has been particularly shown and described with reference to preferred embodiments thereof, it will be understood by those skilled in the art that the foregoing and other changes in form and details may be made therein without departing from the spirit and scope of the invention.

Having thus described my invention, what is claimed as new and desired to be secured by Letters Patent is:

1. A suspension assembly for a transducer head comprising:
    a U-shaped flat spring element having a pair of parallel leg portions with a connecting bit portion;
    a head carriage formed adjacent either said spring element bite portion which is remote from the free ends of said parallel leg portions or, alternatively, adjacent the free ends of said parallel leg portions;
    a base member formed adjacent the other one of either said spring element bite portion which is remote from the free ends of said parallel leg portions or, alternatively, adjacent the free ends of said parallel leg portions, respectively, such that the none-disabled portions of said spring element parallel leg portions extend with the major surfaces thereof in parallel from said carriage to said base member;
    a pair of built-up stiffener sections respectively formed about the central section of each of said spring element parallel leg portions and extending from said carriage to said base member to confine and immobilize said central portions second of each said spring element parallel leg portions and limit flexure of said spring element parallel leg portions to the non-disabled portions between said stiffener sections and said base member and carriage; and
    a transducer carried by said carriage whereby deflection of said carriage and flexing of said spring element parallel leg portions effects parallel translation of said transducer.

2. The transducer head suspension assembly of claim 1 wherein the axis of said transducer is parallel to the major surfaces of said spring element parallel leg portions when the latter are in an unstressed condition.

3. The suspension assembly of claim 2 wherein said cam is mounted about the same axis as a diskette cooperating with said transducer carried by said carriage.

4. The suspension assembly of claim 1 wherein said assembly is formed with said carriage member formed about the bite portion of said U-shaped spring element and said base member formed about the distal ends of said spring element cantilevered parallel leg portions.

5. A magnetic transducer head suspension assembly comprising:
    a pair of parallel flexure spring elements of uniform width and thickness;
    a transducer carriage secured to the first ends of said parallel spring elements;
    a base member secured to the opposite ends of said parallel spring elements; and
    a pair of plastic stiffener elements respectively molded about a central portion of each of said parallel spring elements intermediate said carriage and said base member causing said spring elements to function as two pairs of shortened parallel flexure spring elements; wherein said flexure spring elements are formed of a single continuous U-shaped length of flexure spring material with the parallel elements extending between said carriage and said base member.

6. The magnetic transducer head suspension assembly of claim 5 wherein said carriage is formed about the bite portion of said U-shaped length of flexure spring material.

7. The magnetic transducer head suspension assembly of claim 6 further comprising:
    a cam follower element mounted on said carriage and a rotary cam engaging said cam follower element to impart a translating deflection of said transducer carriage member with respect to said base member.

* * * * *